May 1, 1934.  A. S. DANA ET AL  1,956,639
ELECTRICAL CONDUCTOR
Filed Jan. 5, 1931
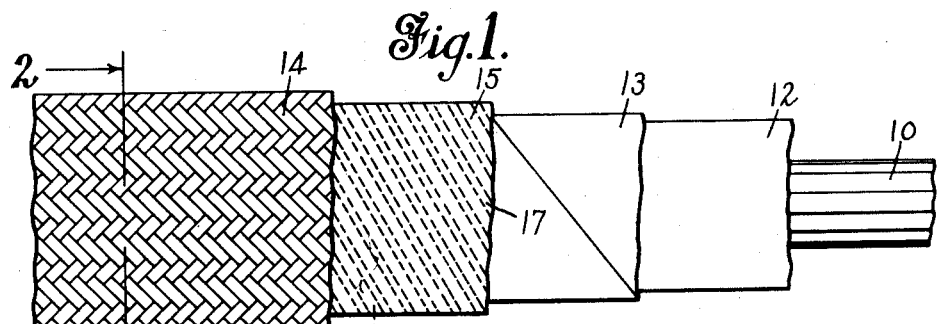
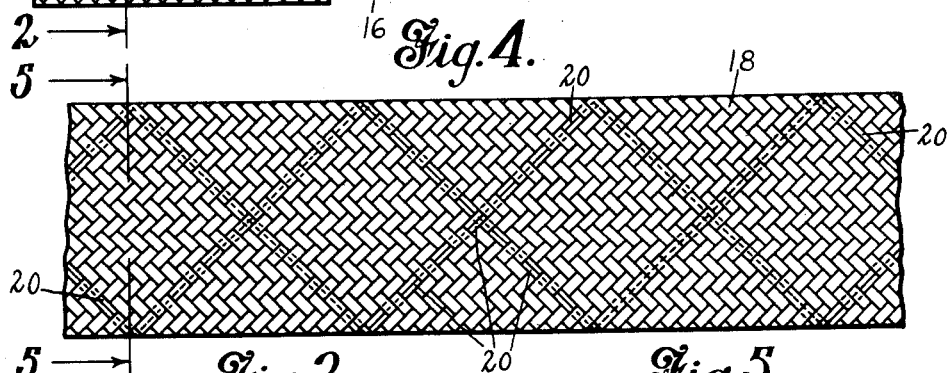
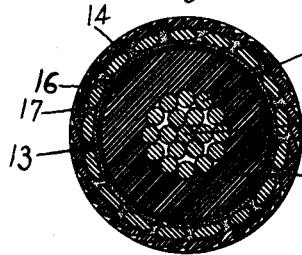
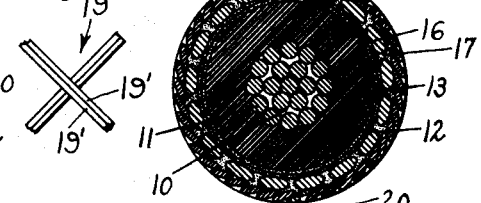
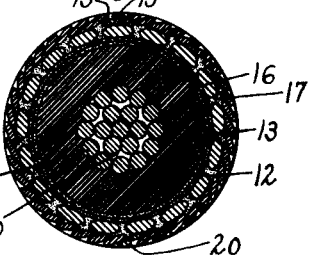
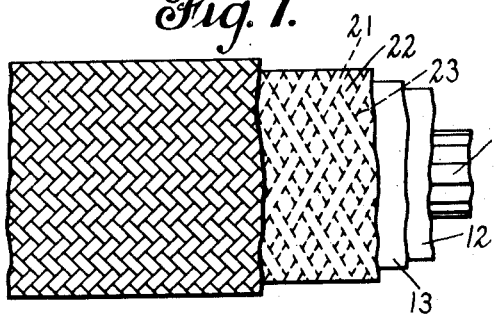
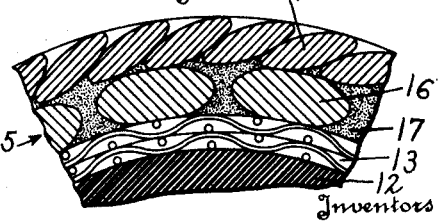
Inventors
Alan S. Dana
Ralph B. Norton
By
Attorneys Patented May 1, 1934

1,956,639

UNITED STATES PATENT OFFICE 1,956,639

ELECTRICAL CONDUCTOR

Alan S. Dana, New Haven, and Ralph B. Norton, Seymour, Conn., assignors to The Kerite Insulated Wire & Cable Company, Incorporated, Seymour, Conn.

Application January 5, 1931, Serial No. 506,620

20 Claims. (Cl. 173—264)

This invention relates to electrical conductors, and more particularly to insulated cables adapted to carry relatively high voltages, or, in any case, such voltages as are likely to cause sparking from the conductor sheath.

Where there is sparking or arcing from the insulating sheath of the conductor caused by the presence of induced currents which have no proper outlet or means of escape, there is likely to be rapid disintegration of the cable structure at the point or points of arcing, and consequent failure of the cable.

One of the objects of the present invention is to overcome this sparking or arcing in a convenient and commercially practicable manner.

We aim to provide an insulated electric cable having a novel and improved conductor for carrying off from the sheath structure enclosing the metallic element or elements, the troublesome current or currents caused by induction.

As a conducting means for carrying off induced currents from the sheath, we propose to furnish an element which is flexible and which does not stiffen the cable, and which has the requisite conductivity for the purpose in view.

Another object is to furnish a conductor for the above-mentioned purpose which can be conveniently incorporated in the cable structure and which has a number of advantageous properties in actual service.

Another object is to furnish an improved structure for insulating and sheathing high tension wires.

To these and other ends the invention consists in the novel features and combinations of parts to be hereinafter described and claimed.

In the accompanying drawing:

Figure 1 is an elevational view of an electric cable embodying our invention showing the different layers surrounding the metallic conducting core;

Fig. 2 is a section on line 2—2 of Fig. 1;

Fig. 3 is an enlarged detail of a portion of Fig. 2;

Fig. 4 is an elevation of a portion of a cable structure of somewhat modified form;

Fig. 5 is a section on line 5—5 of Fig. 4;

Fig. 6 is a detail of the wires in the outer sheath used in this type of cable, and Fig. 7 is an elevational view of a still further modified form of cable provided with our improvements.

In the form of cable shown in Figs. 1, 2 and 3, the metallic core 10 is made up of a plurality of parallel wires 11, but the particular type of metal core employed is not of importance. This core is surrounded by a body 12 of insulation of high dielectric strength, which insulation may be conveniently constituted, for example, by a suitable rubber compound such as has heretofore been extensively used for the insulation of electric cables. Surrounding the high dielectric layer 12 is a layer 13 which is preferably formed of rubber filled tape or the like wound about the body 12. In the particular form shown, the cloth layer is formed of a comparatively narrow strip helically wound in such a manner as to produce a two-ply cloth sheath surrounding the high dielectric, but the particular form of this sheath may be varied, as well as the material of which it is constituted. In this particular case the jacket of the cable is of braided construction and this braided jacket is shown at 14. In this case the elements of the braid are made, for example, from suitable asbestos yarn, although other material may be used if desired.

Between the layer 13 and the outer jacket 14 is interposed a layer 15 which is wholly or partially of conducting material suitable for enabling voltage induced on the sheath to be carried off and satisfactorily disposed of with the absence of arcing and like discharges. In this particular form of the invention, the layer 15 comprises a number of parallel thread-like elements 16 laid on the wrapping 13 helically and evenly spaced from each other. Upon these parallel helical elements is imposed a flexible conducting paste, which fills the parallel spaces between the elements, as shown at 17, and causes a plurality of parallel conducting elements of paste to be presented in the layer 15, such elements being spaced from each other by the intervening elements 16. In constructing the cable, the elements 16 are first wound on the layer 13 in the proper spaced relation, and then the grooves between these elements are filled with the conducting paste. The elements 16 are preferably made of some suitable fibrous material, and if desired, asbestos yarn can be used for this purpose. The conducting paste is held in place by these elements and lodged between them, as above stated, so as to form a plurality of parallel conducting portions which in a general sense run lengthwise of the conductor. The paste which we prefer to employ is of a non-metallic character and in the preferred form comprises carbon, which, by reason of its conductivity and its resistance to electrolysis and corrosion, is admirably suited to the purposes in view. Preferably the carbon paste is made by using as a starting material plumbago, which is a mixture of amorphous and flaked graphite, and readily lends itself to the manufacture by known methods of a conducting paste which achieves the purposes which we have in view. For creating a suitable paste, the plumbago can be mixed with water or other suitable vehicle. The paste can be conveniently applied to the cable by simply smearing it on the carrier members 16.

By constructing the cable as above described, means are provided for effectively carrying off from the sheath the electric currents created therein by induction or otherwise. In the particular form described, the paste bodies between the carrier elements 16 constitute a plurality of conductors connected in parallel, which convey the sheath currents along the cable. Different means may be employed for carrying the current from the paste to a suitable ground. For example, a copper strip (not shown) can be caused to penetrate into the paste and to carry the current therefrom through any suitable outer jacket or otherwise to a suitable ground. However, such special arrangements are not necessary where the outer jacket of the cable is constructed so as to have sufficient conductivity for the purpose.

In the form shown in Figs. 4, 5 and 6, it is assumed that the outer jacket is made of non-conducting material such as cotton coated with wax. Where such a non-conducting jacket is employed, we may incorporate therein suitable metallic conducting elements which cooperate with the conducting paste in disposing of the sheath current. Where such conducting elements are incorporated in the jacket, we may constitute said elements by comparatively fine metal wires, which are braided into the cover or jacket at intervals. As shown in Fig. 6, each metallic element 19 may be formed of two fine wires 19' parallel and in contact with each other. The two wires together form an element which is of about the same diameter as the elements of which the jacket is braided. The conductors are braided so that turns are created which cross each other at frequent intervals and are in contact with each other where they cross, as shown in Fig. 6. It will be understood that as in the case previously described, a conducting paste is located immediately beneath the outer jacket, and where the metal conductors braided into the jacket pass to the under surface thereof, they are in contact with the paste, whereas portions of said conductors which pass to and are accessible at the exterior of the jacket, as indicated at 20 in Fig. 4, provide for the carrying off of the current from the paste through the jacket at shortly spaced intervals to a suitable ground with which said conductor portions are in contact.

Except for the outer jacket, the cable shown in Fig. 4 is the same as that shown in Fig 1.

In Fig. 7, we have shown a further modified structure in which the conducting layer beneath the outer jacket is somewhat differently constituted, although comprising, as before a suitable carbon-containing conducting paste. In this case, the paste, instead of being laid upon a plurality of parallel elements all wound on the cable in the same direction, is superposed upon a carrier which is a coherent fabric having elements which cross each other. In this form the paste carrier is preferably constituted by a layer of suitable braided material. The elements 21 of the braid should conduct electricity, for which purpose they can be made of a suitable conducting yarn, and the plumbago paste 22 is introduced into and held in the diamond-shaped pockets or interstices 23 formed by the crossing braid elements. In this case the paste mass as a whole is less continuous in a generally longitudinal direction than in the case illustrated in Fig. 1, but the current is carried from one small paste body to another by the intervening conducting material of the carrier braid, and as the carrier braid can be very readily formed in the process of manufacture of the cable, this type of construction is considered preferable in certain cases.

One of the advantages of employing paste in the structure is that it does not materially stiffen the structure of the cable. Where a paste containing graphite is employed, it will be found that, while it offers little resistance to the electric current, the resistance is not so low as to cause appreciable sheath losses. On the other hand, the resistance is much lower than would be the case with any metallic paste with which we are familiar. With a conducting paste containing plumbago, such as can be found on the market, a resistance of about 250 ohms per foot of cable can be provided, and this we regard as suitable for the purpose. This particular resistance is mentioned simply for purposes of illustration. A carbon paste also has the very decided advantage that it is not subject to corrosion or electrolysis.

While we have shown and described several forms of our invention, it will be understood that these are merely by way of example and that various changes may be made in these forms and other forms adopted and used without departing from the scope of our invention as defined in the following claims.

What we claim is:

1. In an electric cable for carrying high voltages, the combination of a metallic core, a layer of material of high dielectric strength surrounding said core, a flexible non-metallic conductive layer having a low resistance located wholly outside of the high dielectric layer and comprising a carbonaceous paste at ground potential running lengthwise of the cable, and a flexible somewhat conductive braided cover for the cable enclosing the conductive layer at the outside and in electrical connection therewith.

2. In an electric cable, a metallic core, a layer of high dielectric strength, an outer jacket, a conductor interposed between the high dielectric layer and the outer jacket, said conductor comprising a graphitic paste adapted to be grounded, and a paste carrier comprising a number of elements surrounding the core and separated from each other laterally to form paste-receiving spaces.

3. In an electric cable, a metallic core, an insulating layer of high dielectric strength, an outer jacket, a conductor interposed between the high dielectric layer and the outer jacket, said conductor comprising a paste, and a paste carrier comprising a number of elements surrounding the core, said elements being disposed helically, said paste being in substantially continuous bodies between said elements and being connected to ground.

4. In an electric cable, a metallic core, a high dielectric layer, an outer jacket, a conductor interposed between the high dielectric layer and the outer jacket, said conductor comprising a graphitic paste, and a paste carrier comprising a number of elements between which the paste is interposed surrounding the core and crossing each other, said paste being connected to ground.

5. In an electric cable, a metallic core, an insulating layer of high dielectric strength, an outer jacket, a conductor interposed between the high dielectric layer and the outer jacket, said conductor comprising a graphitic paste, and a paste carrier comprising a number of elements surrounding the core and crossing each other, said paste carrier being formed as a braid and the paste being held in the interstices of the braid and connected to ground.

6. In an electric cable, a metallic core, an insulating layer of high dielectric strength, an outer jacket, and a layer between the high dielectric layer and the outer jacket comprising a number of elements embracing the high dielectric layer, and a conducting paste located in spaces between said elements, said paste being connected to ground.

7. An electric cable for carrying high voltages having an insulating sheath and means located in the sheath structure for carrying off induced currents, comprising a conducting paste located within the sheath structure and a number of thread-like elements for holding the paste in place, said paste being connected to ground.

8. In an electric cable, a core member, an insulating layer of high dielectric strength, an outer jacket, a flexible conducting element of non-corroding material interposed between the outer jacket and the high dielectric layer and surrounding said high dielectric layer, and fine conductor elements in the outer jacket having portions disposed in contact with said conductor element and other portions disposed at the outside of the jacket.

9. In an electric cable for carrying high voltages, the combination of a metallic core, a braided jacket, a layer of material of high dielectric strength surrounding the core and enclosed by said jacket, a flexible non-metallic conducting paste located wholly outside of the high dielectric layer and disposed beneath said jacket, and a flexible carrier for said paste interposed between the braided jacket and the high dielectric layer.

10. An electric cable having a braided outer jacket, a plurality of fine conductor elements braided in said jacket and crossing each other at intervals and having conducting portions disposed at the exterior of the jacket for making external electrical connections, a flexible conducting layer of carbonaceous paste beneath said jacket in electrical connection with said conductor elements, a layer of high dielectric strength disposed beneath said conducting layer, and a metallic conductor core disposed beneath and surrounded by said high dielectric layer.

11. In an electric cable for carrying high voltages, the combination of a metallic core, a layer of material of high dielectric strength surrounding said core, a layer of insulating tape surrounding said first-named layer, a flexible non-metallic conductive layer having a low resistance surrounding said layer of insulating tape and comprising a carbonaceous paste at ground potential, and a flexible non-metallic cover for the cable, said paste being located immediately under said cover.

12. In an electrical cable for carrying high voltages, the combination of a metallic core, a layer of insulating material of high dielectric strength surrounding said core, a flexible braided cover at the exterior of the cable, and a flexible conductive layer of carbonaceous paste having a low resistance located wholly outside of said first-named layer and immediately beneath the braided cover for carrying induced currents to ground.

13. In an electric cable for carrying high voltages, the combination of a metallic core, a layer of material of high dielectric strength surrounding said core, a braided cover for the cable at the exterior thereof, and a flexible non-metallic conductive layer located wholly outside of the layer of high dielectric strength and beneath the braided cover, said flexible conductive layer comprising a carbonaceous paste at ground potential and a carrier for the paste having portions disposed laterally of each other between which the paste enters.

14. In an electric cable for carrying high voltages, a metallic core, a layer of material of high dielectric strength surrounding said core, a plurality of thread-like elements surrounding the high dielectric layer and extending generally lengthwise of the cable and providing between them spaces adapted to hold bodies of a conducting paste so as to constitute a carrier for the paste, bodies of paste located between said elements, said bodies being adapted to be grounded, and a cover for the cable enclosing the conductive layer at the outside.

15. In an electric cable, a metallic core, a layer of material of high dielectric strength surrounding said core, a flexible cover for the cable at the exterior of the same, a layer of material spacing said cover from said high dielectric layer and having openings facing outwardly and accessible by removal of said cover, and bodies of initially plastic conducting material in said openings adapted to be grounded for carrying off induced currents.

16. In an electric cable, a metallic core, a layer of material of high dielectric strength surrounding said core, a layer of insulating tape surrounding said core, a flexible braided covering layer for the cable at the exterior thereof, a layer composed of thread-like elements spacing apart two of the aforesaid layers, said elements bounding laterally a plurality of openings facing toward the outside of the cable, and bodies of conducting paste in said openings for carrying off induced currents.

17. In an electric cable for carrying high voltages having a metallic conductor core and an insulating structure surrounding said core and including an outer jacket, a paste carrier of asbestos strands located beneath the outer jacket, and conducting paste located between the strands for conducting induced currents to ground.

18. In an electric cable for carrying high voltages having a metallic conductor core and an insulating structure surrounding the core including an outer braided asbestos jacket, an asbestos paste-carrier located beneath said jacket, a body of conducting paste carried by said paste-carrier, said carrier having a plurality of outwardly facing openings or recesses in which the paste is received and held, said paste being adapted to be connected to ground to carry off induced currents.

19. An insulated electric cable for carrying high voltages, having about the conductor core a sheath structure comprising the cable insulation, and a conductive layer of non-corroding material within the lines of the sheath structure adapted to be grounded at a plurality of points in the length of the cable, said layer being of appreciable thickness and comprising a paste-carrier and bodies of conductive paste within the lines of the carrier.

20. In an electric cable for carrying high voltages having a metallic conductor core and an insulating structure surrounding said core and including a flexible non-metallic outer jacket, a layer located beneath the outer jacket and comprising fibrous strands presenting between them outwardly facing pockets, and initially plastic conducting material in said pockets for conducting induced currents longitudinally of the cable on their way to ground, said material being maintained in said pockets by said outer jacket.

ALAN S. DANA.
RALPH B. NORTON.